Dec. 9, 1930.   G. A. CARLSON   1,784,575
BEATER SPOON
Filed Oct. 2, 1929
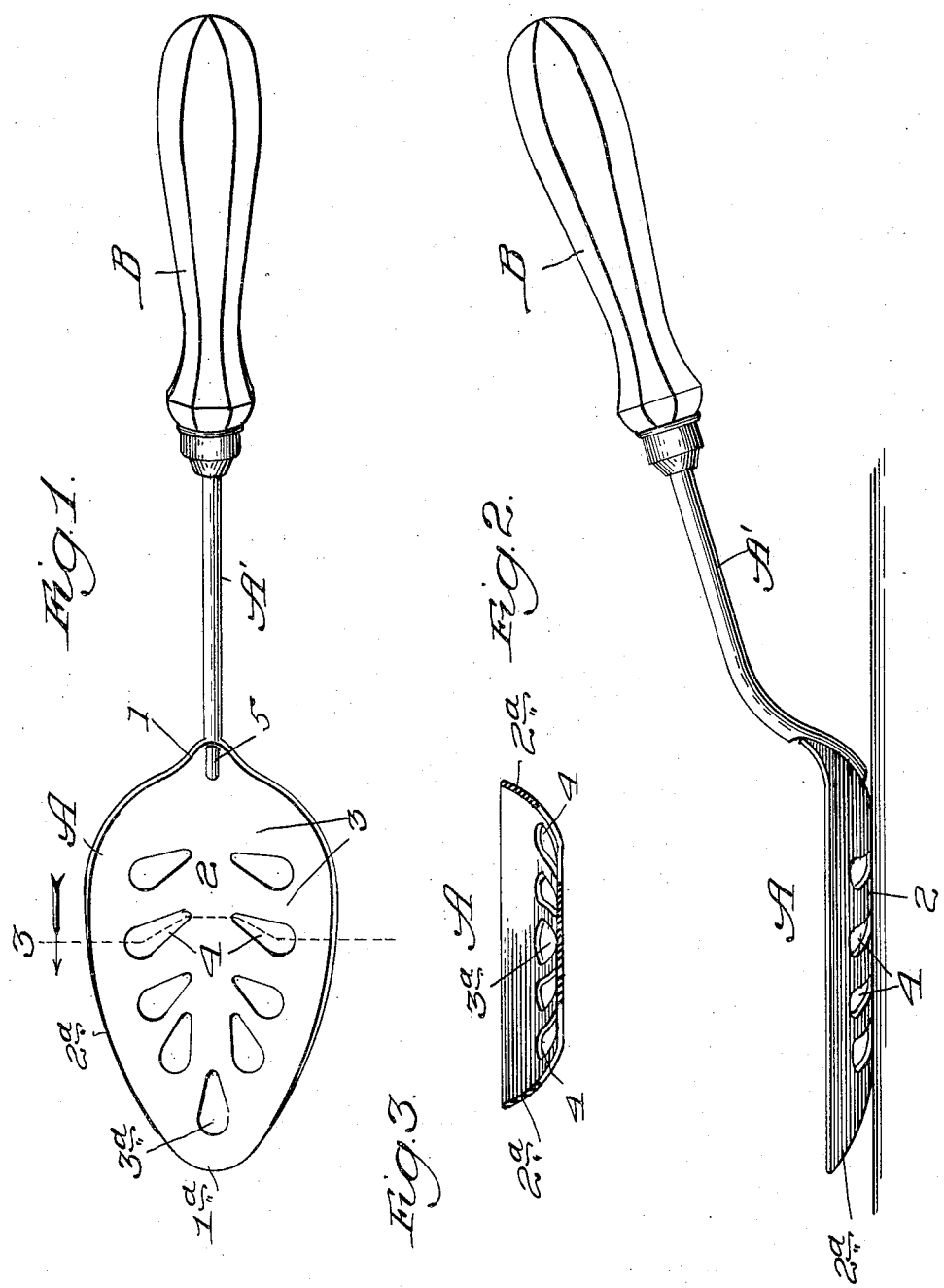
Inventor:
Gustav A. Carlson Patented Dec. 9, 1930

1,784,575

UNITED STATES PATENT OFFICE

GUSTAV A. CARLSON, OF CHICAGO, ILLINOIS, ASSIGNOR TO THE BOYE NEEDLE COMPANY, OF CHICAGO, ILLINOIS, A CORPORATION OF ILLINOIS

BEATER SPOON

Application filed October 2, 1929. Serial No. 396,756.

This invention relates particularly to a spoon adapted for use as a kitchen utensil; and the primary object is to provide an improved spoon which can be used for beating and whipping purposes.

The improved spoon may be usefully employed for making batter mixtures, cake dough, and the like; for creaming butter; for whipping cream; and, generally, for beating and whipping confectionery mixtures, and so forth.

The invention is illustrated in a preferred embodiment in the accompanying drawing, in which—

Figure 1 is a plan view of the improved spoon; Fig. 2, a side elevational view; and Fig. 3, a transverse section taken as indicated at line 3 of Fig. 1.

In the illustration given, the spoon comprises a bowl A equipped with a shank or stem A'; and a handle B secured to said shank.

The bowl A of the beater-spoon is of the usual contour in plan. That is, it is of somewhat oval shape, being provided at one end with the shank-attaching extremity 1 and at the other end with a tip portion 1ª.

In cross section, the bowl has a flat bottom portion 2 and an upcurved marginal portion 2ª. The flattened bottom portion presents, in plan, a somewhat oval outline, as indicated by the dotted line 3 in Fig. 1, this oval having a somewhat pointed tip portion 3ª near the tip-end of the bowl.

The bowl is provided with a series of perforations 4 which are formed partially in the flat bottom and partially in the upcurved marginal portions. Preferably, these perforations are elongated and are widened at their outer end, being of somewhat triangular shape, but with rounded, wide outer ends; and, preferably, these elongated perforations are obliquely set, with the exception of the one in the tip portion of the bowl, which has its axis disposed longitudinally of the bowl.

It has been found in practice that by reasonable flattening of the bowl, taken in connection with the perforations, a better cutting and whipping effect can be secured than can be secured with known beater-spoons. In this connection, it is noted that the edges of the portion of the slots which lie in the flat bottom portion of the bowl are in a common plane, tending to improve the cutting effect in whipping batter, confectionery mixtures, or the like. In making cake dough, for example, the shape of the spoon enables the butter to be cut and worked into the remainder of the dough-mixture with greater facility than has been possible with beater-spoons having curved bottoms.

The bowl may be attached to the shank A' in any desired way. In the illustration given, the shank is provided at its extremity with a rivet-lug 5 which extends through a slot in the base portion of the bowl and is riveted to the bowl.

What I regard as new, and desire to secure by Letters Patent, is:

A beater-spoon comprising a handle-equipped single bowl-member having a flat bottom and an upcurved marginal rim-portion extending completely around the bowl-member, said bowl-member having slots therein formed partially in the flat bottom and partially in the upcurved rim-portion.

GUSTAV A. CARLSON.